(12) United States Patent
May

(10) Patent No.: US 12,045,698 B1
(45) Date of Patent: Jul. 23, 2024

(54) SYSTEM, METHOD, AND COMPUTER PROGRAM FOR A MACHINE LEARNING MODEL-AGNOSTIC CLOUD-AGNOSTIC NO-CODE ONBOARDING PLATFORM

(71) Applicant: Amdocs Development Limited, Limassol (CY)

(72) Inventor: Pavel Yefim May, Rishon leZion (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 933 days.

(21) Appl. No.: 17/088,423

(22) Filed: Nov. 3, 2020

(51) Int. Cl.
G06F 8/35 (2018.01)
G06F 8/34 (2018.01)
G06F 8/36 (2018.01)
G06N 20/00 (2019.01)

(52) U.S. Cl.
CPC .............. *G06N 20/00* (2019.01); *G06F 8/34* (2013.01); *G06F 8/35* (2013.01); *G06F 8/36* (2013.01)

(58) Field of Classification Search
None
See application file for complete search history.

(56) References Cited

U.S. PATENT DOCUMENTS

| | | | |
|---|---|---|---|
| 9,996,804 B2 | 6/2018 | Bowers et al. | |
| 10,387,798 B2 | 8/2019 | Duggan et al. | |
| 10,614,375 B2 | 4/2020 | Duggan et al. | |
| 10,726,356 B1* | 7/2020 | Zarandioon | G06N 7/01 |
| 11,636,401 B2* | 4/2023 | Dhingra | G06N 5/04 706/12 |
| 11,693,953 B2* | 7/2023 | Panigrahi | G06F 21/577 726/22 |
| 2016/0012350 A1* | 1/2016 | Narayanan | G06F 9/4484 706/12 |
| 2016/0148115 A1 | 5/2016 | Sirosh et al. | |
| 2016/0358103 A1* | 12/2016 | Bowers | G06F 9/4881 |
| 2019/0228261 A1* | 7/2019 | Chan | G06F 16/221 |
| 2019/0325353 A1 | 10/2019 | Aftab et al. | |
| 2021/0081720 A1* | 3/2021 | Polleri | G06F 16/9024 |

OTHER PUBLICATIONS

"Low Code vs No Code in the Enterprise," bmc blogs, DevOps Blog, Dec. 11, 2018, 17 pages, from https://www.bmc.com/blogs/low-code-vs-no-code/.

\* cited by examiner

*Primary Examiner* — Marina Lee
(74) *Attorney, Agent, or Firm* — Zilka-Kotab, P.C.

(57) ABSTRACT

As described herein, a system, method, and computer program are provided for a machine-learning model-agnostic cloud-agnostic no-code onboarding platform. In use, a universal unified interface to a Model-Agnostic Onboarding Workflow (MAOW) platform is provided, wherein the MAOW platform is configured as a no-code, model-agnostic, cloud-agnostic platform. Additionally, at least one machine learning model is onboarded using the MAOW platform, based on the universal unified interface. Further, the at least one machine learning model is deployed from the MAOW platform to at least one target environment.

18 Claims, 14 Drawing Sheets

```
"models": {
    {
        "main_model_name": "ExternalPythonModel",
        "model_folder_name": "ExternalPythonModel",
        "main_module_name": "key_drivers",
        "main_method_name": "model_main",
        "###": "Valid input types: database|pickle|local_csv|blob_csv",
        "input_type": "database",
        "input_sqls": {
            "input_df": "select * from KPIInput"
        },
        "input_pickle_file": "",
        "###": "Valid output types: database|pickle|local_csv|blob_csv",
        "output_type": "database",
        "output_pickle_file": "",
        "output_tables": {
            "KpiOutput": {
                "delete": false,
                "schema": "datastore"
            }
        }
    }
}
```

FIG. 6

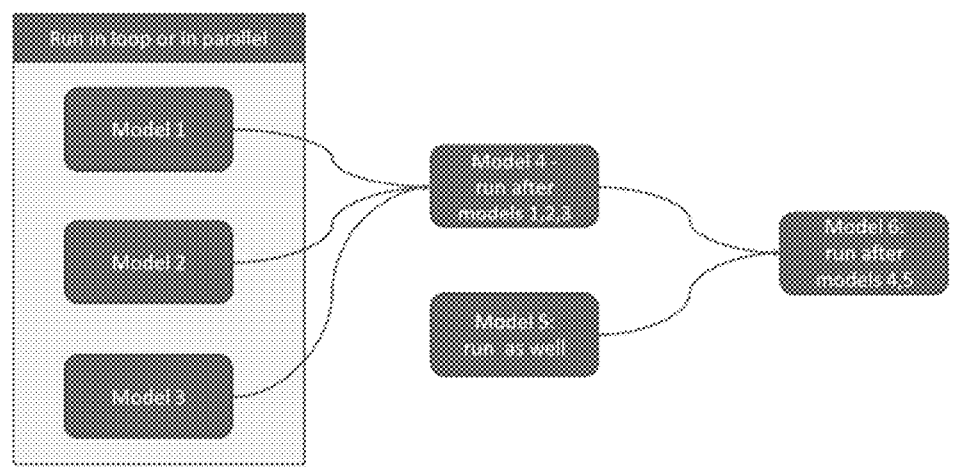
FIG. 7

SYSTEM, METHOD, AND COMPUTER PROGRAM FOR A MACHINE LEARNING MODEL-AGNOSTIC CLOUD-AGNOSTIC NO-CODE ONBOARDING PLATFORM

FIELD OF THE INVENTION

The present invention relates to onboarding techniques for machine learning models.

BACKGROUND

Onboarding a machine learning model refers to processes used to deploy the machine learning models to a target environment. The target environment may be a cloud platform, an on premises platform, a data center, a local development computer, etc. Existing machine learning model onboarding techniques require significant effort to integrate the machine learning model with different running environments, such as development, test or production. To date, custom onboarding solutions have been required, which are time consuming, error vulnerable and have inconsistent interface and data formats. Furthermore, these challenges only increase when onboarding to multiple different targets environments.

There is thus a need for addressing these and/or other issues associated with the prior art.

SUMMARY

As described herein, a system, method, and computer program are provided for a machine-learning model-agnostic cloud-agnostic no-code onboarding platform. In use, a universal unified interface to a Model-Agnostic Onboarding Workflow (MAOW) platform is provided, wherein the MAOW platform is configured as a no-code, model-agnostic, cloud-agnostic platform. Additionally, at least one machine learning model is onboarded using the MAOW platform, based on the universal unified interface. Further, the at least one machine learning model is deployed from the MAOW platform to at least one target environment.

BRIEF DESCRIPTION OF THE DRAWINGS

FIG. 6 illustrates an example of a configuration file used for onboarding a machine learning model to the platform of FIG. 1, in accordance with one embodiment.

FIG. 7 illustrates a workflow of the platform of FIG. 1, in accordance with one embodiment.

DETAILED DESCRIPTION

Figure 1:
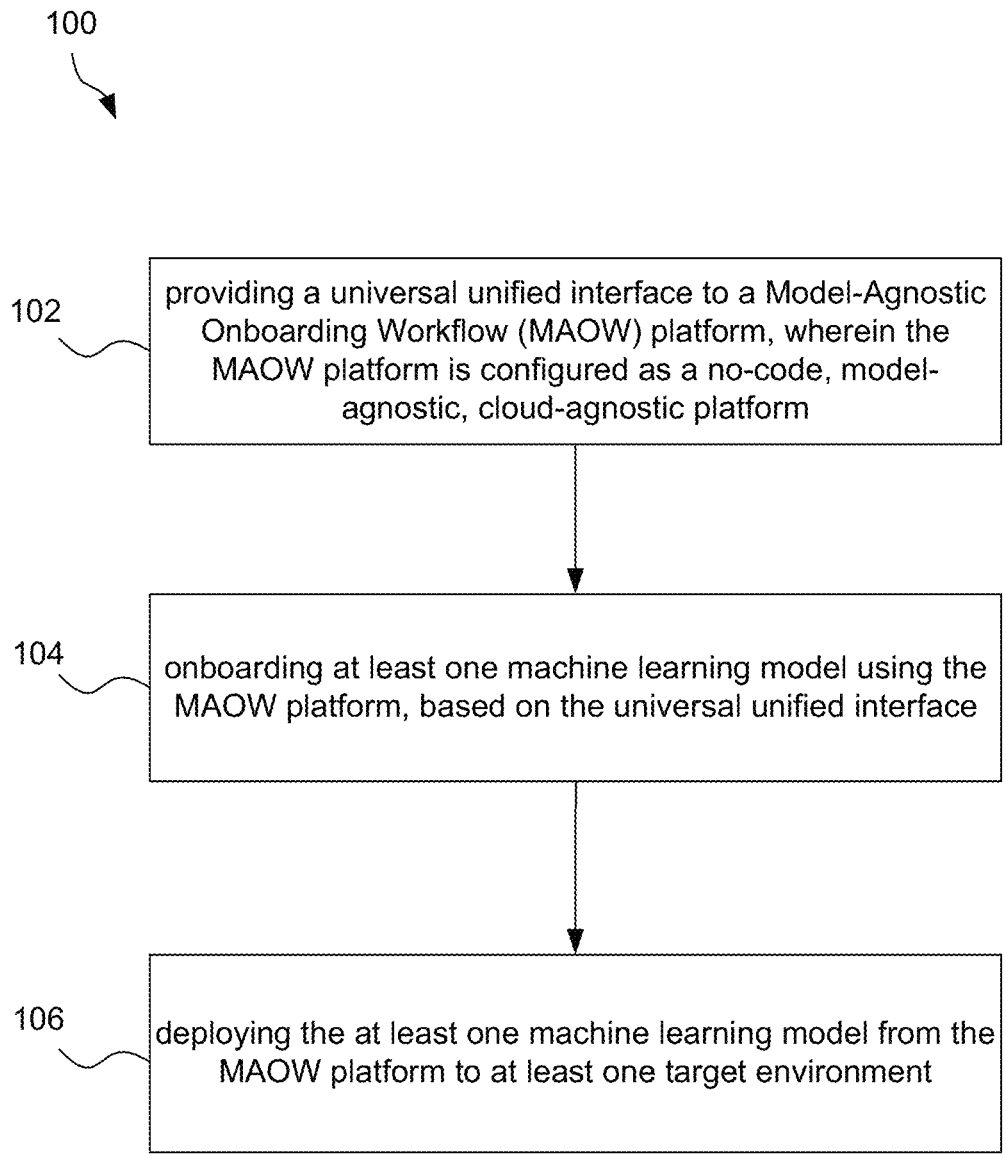
FIG. 1 illustrates a method for providing a machine-learning model-agnostic cloud-agnostic no-code onboarding platform, in accordance with one embodiment.
Figure 12:
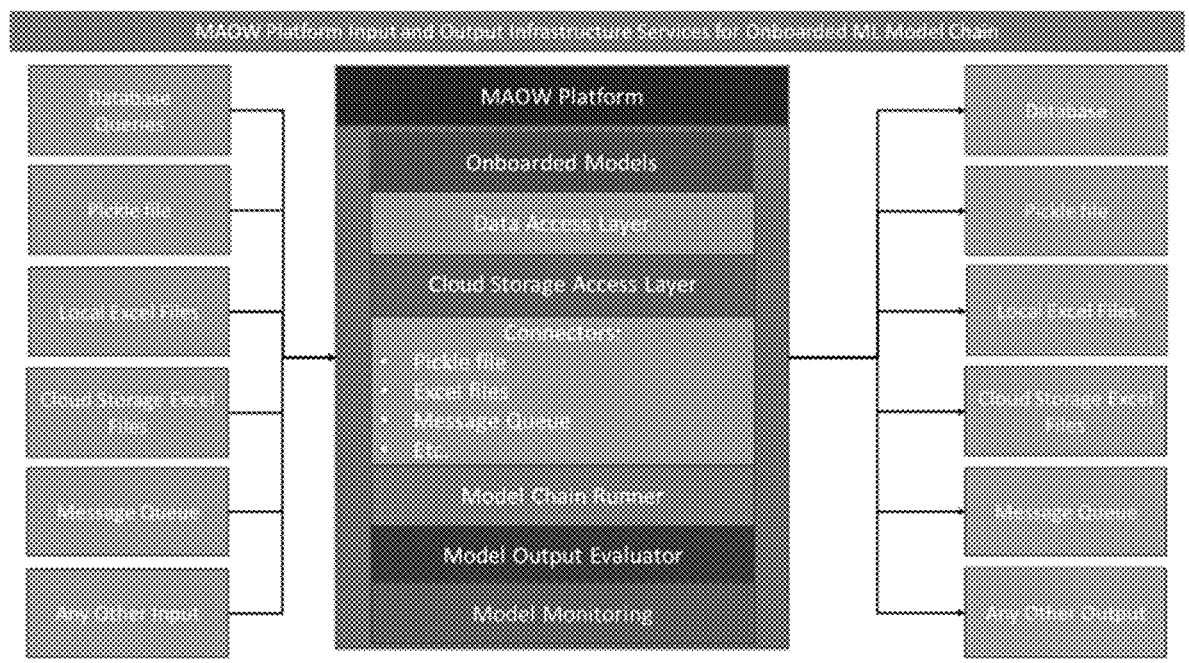
FIG. 12 illustrates a block diagram of the infrastructure services provided by the platform of FIG. 1 for an onboarded machine learning model, in accordance with one embodiment.
Figure 13:
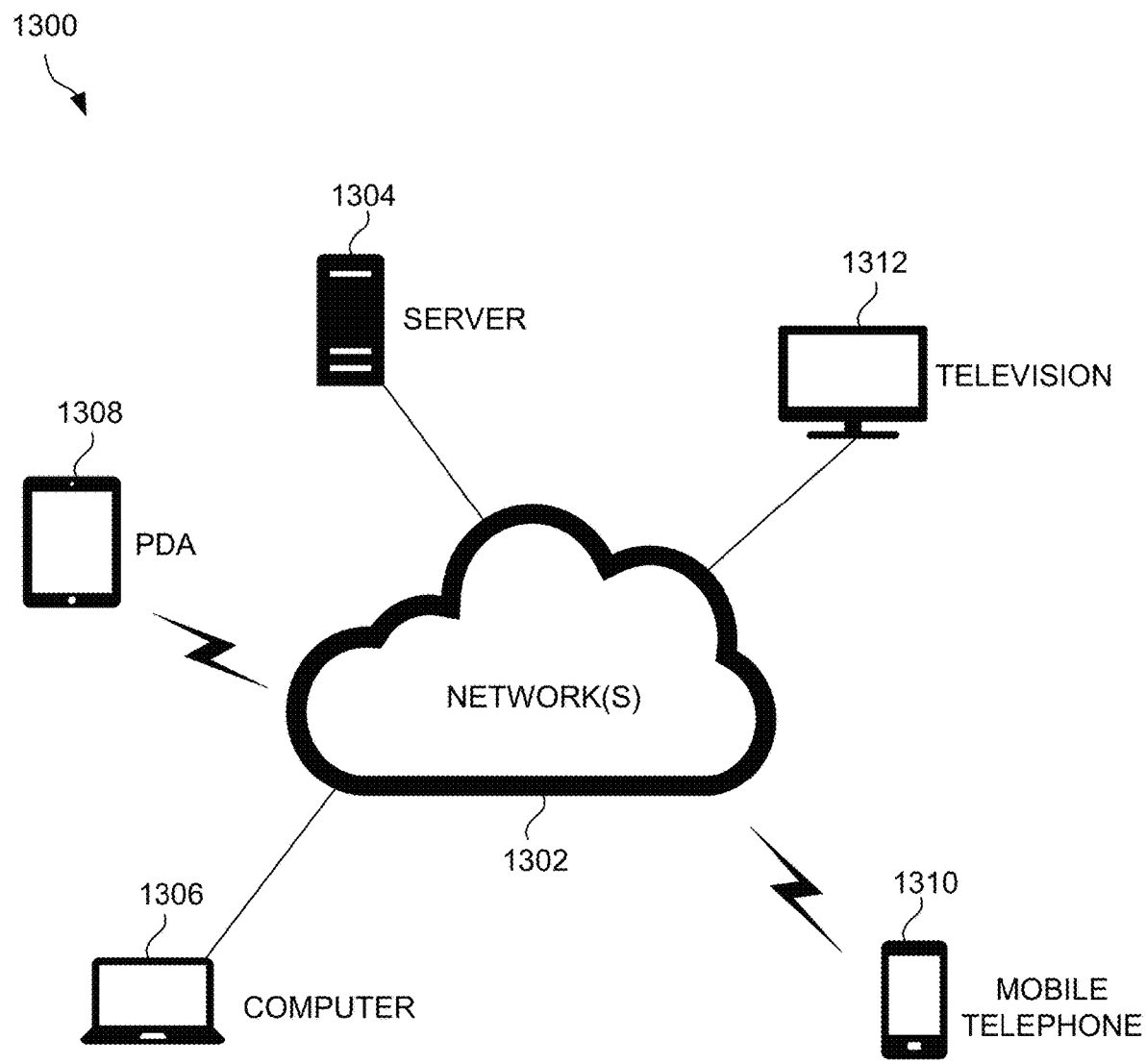
FIG. 13 illustrates a network architecture, in accordance with one possible embodiment.

FIG. 1 illustrates a method 100 for providing a machine-learning model-agnostic cloud-agnostic no-code onboarding platform, in accordance with one embodiment. The method 100 may be carried out by any computer system capable of providing the platform in accordance with the descriptions below. FIGS. 12 and 13 provide various examples of the computer systems that may execute the present method 100.

In operation 102, a universal unified interface to a Model-Agnostic Onboarding Workflow (MAOW) platform is provided (e.g. defined), wherein the MAOW platform is configured as a no-code, model-agnostic, cloud-agnostic platform. The MAOW platform operates, at least in part, to onboard (e.g. train) machine learning models and deploy the onboarded machine learning models to target environments. The MAOW platform may include a workflow that utilizes a directed acyclic graph (DAG) for running multiple models as a set of tasks with no directed cycles, and an input and output data Cache Inheritance Engine for serving multiple models, as described in more detail below with reference to the subsequent figures.

The MAOW platform is no-code in at least one respect, which means that the MAOW platform uses a visual application system for at least one service which allows users to use the service (e.g. onboarding, etc.) without requiring the user to enter code. For example, the MAOW platform may enable automatic no-code configuration and customization of machine learning models. In other respects (e.g. for other services), the MAOW platform may not necessarily be no-code.

The MAOW platform is also model-agnostic, which means that any single machine learning model or any chain of a plurality of machine learning models may be onboarded with the MAOW platform. The only minimal requirement for the machine learning model onboarding is that the onboarding is adherent to the universal unified interface. In one embodiment, the universal unified interface may be a Unified Universal Interface Contract (UUIC) that serves as an interface between the at least one machine learning model and the MAOW platform. In an additional embodiment, the UUIC may serve both input and output between main methods of the at least one machine learning model and the MAOW platform. For example, the UUIC may be defined as a dictionary map of dictionary maps, which will be explained in more detail with reference to one or more of the subsequent figures below.

The MAOW platform is further cloud-agnostic, which means that the MAOW platform is enabled for a plurality of different supported environments. These environments may include cloud environments, hybrid cloud environments, on-premises environments, data center environments, local computers of development and test environments in which machine learning models are created and tested, etc.

Additionally, in operation 104, at least one machine learning model is onboarded using the MAOW platform, based on the universal unified interface. As noted above, a single machine learning model or a chain of machine learning models may be onboarded using the MAOW platform. In one embodiment, the MAOW platform interfaces a development environment (e.g. Data Scientist native development environment) in which the at least one machine learning model is created.

In another embodiment, the onboarding is performed based on a configuration file. For example, the MAOW platform may enable automatic no-code configuration and customization of the at least one machine learning model. The no-code configuration may define machine learning model-agnostic pre-processing (e.g. reading input for the at least one machine learning model from one or more defined input sources) and post-processing (e.g. writing output of the at least one machine learning model to one or more defined output destinations). The no-code configuration may further define data pre- and post-transformations.

Further, in operation 106, the at least one machine learning model is deployed from the MAOW platform to at least one target environment. The target environment may be a select one or more of any of the above described supported environments. In one embodiment, the at least one machine learning model may be deployed and run as a machine learning pipeline on the target environment.

As an option, the onboarded at least one machine learning model may be run locally (e.g. by the platform) as a prototype to validate correct onboarding of components and their configuration and interaction, where a main method of the onboarded at least one machine learning model is replaced with an empty body leaving only an input and output parameters signature. As another option, a MAOW Model Wrapper API may be used to produce a run-time configuration MAOW Model Wrapper API main onboarding program for a particular input/output for the at least one machine learning model and the onboarded at least one machine learning model may then be tested locally using a preliminary defined generic test case.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Prior art machine learning model onboarding solutions require a customized platform per model and/or environment, along with some manual coding requirements. The embodiments described herein improve prior art solutions by providing a machine-learning model-agnostic cloud-agnostic no-code onboarding platform.

The embodiments describe how the platform:
1) Can be super easily added to Data Scientist native development environment.
2) Eliminates ML model productizing time as well as Data Engineer role as an intermediator between Data Scientist and his/her ML model.
3) Allows Data Scientist MAOW learning curve time to be close to zero.
4) Provides original Unified Universal Interface Contract as interface between ML model or ML model chain and MAOW platform.
5) Provides minimal loosely coupling of ML model or ML model chain with MAOW platform.
6) Provides output database tables metadata allowing ML model output dataset validation for dataset schema, duplicates, etc. to accelerate ML model productizing phase.
7) Provides input and output data Cache Inheritance Engine for serving multiple models.
8) Provides dummy dry "fail fast" feature: To validate correct onboarding of components and their configuration and interaction; and To accelerate ML model or ML model chain creating and onboarding phase especially for time-consuming model train step.
9) Provides a versatile and expandable set of input and output services going beyond existing products.
10) Has automatic generation of API onboarding and test code for running ML model or ML model chain locally or on cloud.
11) Has a tiny portable footprint.

In accordance with the embodiments described herein:

The MAOW platform allows ML model-agnostic super easy onboarding, development accelerating and productizing by abstracting back-end complexity of model onboarding.

The MAOW platform provides all necessary infrastructure of multiple services required for repeatable running and deploying ML models in any required environment.

The MAOW platform democratizes the entire process having it less hard and less costly.

The MAOW platform closes the gap by achieving two main targets: Allowing to Data Scientist, including those with no coding background, to concentrate on ML model scientific creating while automating his/her model onboarding integrated with various onboarding services; and Allowing to DevOps to automate ML model or ML model chain deployment on any cloud, on premises or on a hybrid cloud.

The embodiments described herein provide automatic no-code configuration and easy customization, deploying and running of ML model or ML model chain as ML pipeline in multiple environments including development, test or production.

Glossary and Abbreviations

ML— Machine Learning.

MAOW— a lightweight highly portable Model-Agnostic Onboarding Workflow platform for no-code model-agnostic onboarding of multiple ML models.

No-Code—platforms, similar to low code platforms, use a visual application system that allows users to build apps without coding. Usually, this includes drag and drop processes. One example of this is Salesforce CRM, which allows people with coding skills to code, and those who don't have those skills can create simple applications without using any code at all.

Note 1: Any script considered as code like SQL in a textual form can be injected into MAOW platform ML model or ML model chain configuration "as is" with no additional coding.

Note 2: Any non-relational ML model input or output like cloud-based blob storage file, json or binary files (images, video, etc.) can be injected as textual links into MAOW platform ML model or ML model chain configuration "as is" with no additional coding.

Low-code—a development movement where time-consuming manual processes are automated, without hand coding, using a visual IDE environment, an automation that connects to backends and some kind of application lifestyle management system. The whole unit is called a "low code platform".

DAG—a finite directed graph with no directed cycles. That is, it consists of finitely many vertices and edges (also called arcs), with each edge directed from one vertex to another, such that there is no way to start at any vertex v and follow a consistently-directed sequence of edges that eventually loops back to v again. Equivalently, a DAG is a directed graph that has a topological ordering, a sequence of the vertices such that every edge is directed from earlier to later in the sequence.

Cache Inheritance Engine— MAOW platform core component for caching and inheritance of input and output data and providing accumulated data for each model as per its specific path in DAG.

ML Model Chain—a chain of multiple models running one after another inside the same ML pipeline. Output of one ML model in ML model chain can optionally serve as input for the next model in ML model chain.

Onboarding Configuration File—a curated configuration in JSON file format for ML model or ML model chain including metadata for model info, input and output settings, runs, etc.

MAOW Project—a folder with ML model or ML model chain files and MAOW onboarding configuration file.

MAOW Model Wrapper API— No-Code (generated automatically) or optionally coded manually Low-Code application programming interface (API) used for configuring and running ML model or ML model chain that could be optionally packaged as cloud ML pipeline.

ML pipeline—a machine learning pipeline is used to help automate machine learning workflows. They operate by enabling a sequence of data to be transformed and correlated together in a model that can be tested and evaluated to achieve an outcome, whether positive or negative.

Unified Universal Interface Contract (UUIC)—a core component of the suggested solution that provides ML model-agnostic functionality and serves as universal unified interface between ML model or ML model chain main methods and MAOW platform.

Dictionary map—a set of objects (keys) to another set of objects (values) of any type.

DevOps—a set of practices that combines software development and IT operations. It aims to shorten the systems development life cycle and provide continuous delivery with high software quality.

GUI—graphic user interface implemented in any form like stand-alone or web application.

CLI—command line interface for running commands in a terminal window.

MAE—the Mean Absolute Error is one of the many metrics for summarizing and assessing the quality of a machine learning model. MAE measures the average magnitude of the errors in a set of predictions, without considering their direction.

MSE—the Mean Squared Error is a measure of how close a fitted line is to data points.

RMSE—the Root Mean Squared Error is the square root of the mean square error (MSE).

Figure 2:
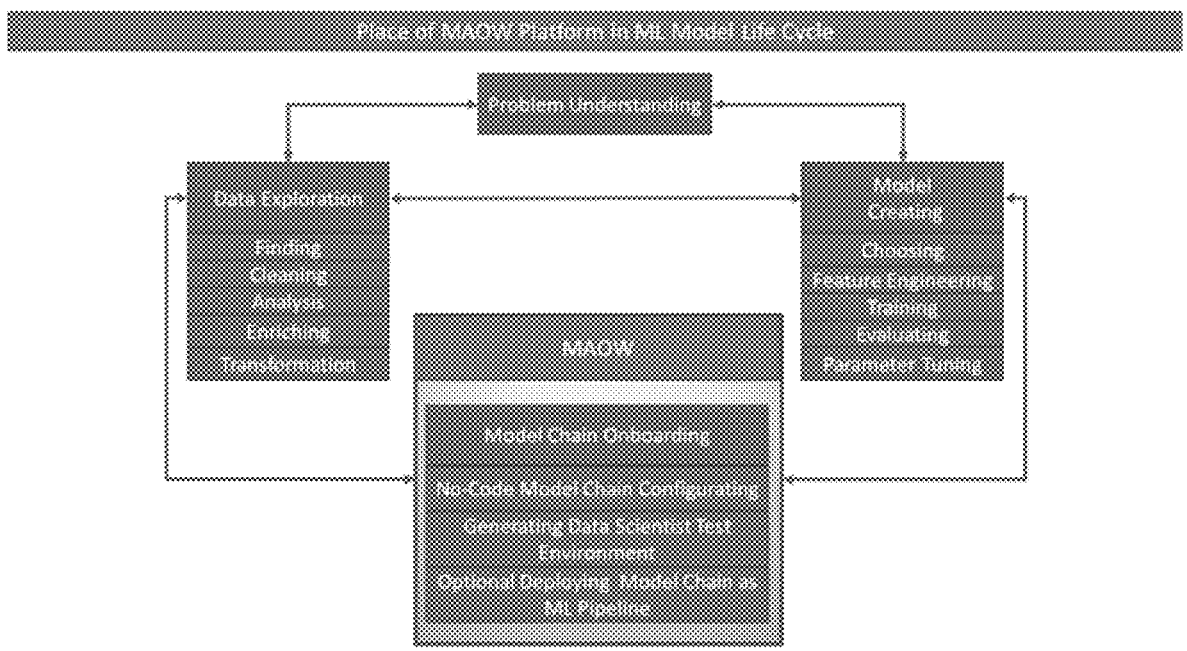
FIG. 2 illustrates a block diagram of a machine learning model lifecycle that utilizes the platform of FIG. 1, in accordance with one embodiment.

FIG. 2 illustrates a block diagram of a machine learning model lifecycle that utilizes the platform of FIG. 1, in accordance with one embodiment.

The MAOW platform may be comprised of the following components and functionalities of ML model onboarding:
MAOW platform itself;
ML model or ML model chain that supports a model-agnostic UUIC between MAOW platform and main methods of ML model or ML model chain;
A UUIC that serves both input and output between ML model or ML model chain main methods and MAOW and defined as a dictionary map of dictionary maps;
No-code or optional low-code configuration that defines ML model-agnostic pre-processing like reading ML model or ML model chain input sources and post-processing like writing ML model or ML model chain output to output destinations as well as required optional data pre- and post-transformations;
No-code or optional low-code onboarding of ML model or ML model chain based on a simple configuration file;
Support for both single ML model and multiple models defined as ML model chain;
Enabled for deploying ML model or ML model chain as ML pipeline on cloud;
Here are several examples of environments where MAOW platform is applicable: Cloud ML environment (e.g. Microsoft Azure, Amazon AWS, Google Cloud, etc.); In a hybrid cloud; On premises ML environment; Data center ML environment; Data Scientist local computer development and test environment; etc.

Based on configuration for a specific ML model-agnostic MAOW platform provides any subset from the following common services and functionalities: All required infrastructure and configuration of input and output for various data sources (e.g. Database, Cloud storage, Message streaming like Kafka or any other, Files like MS Excel, Files like pickle file, Pre- and post-processing REST API or any other internet requests, any other input/output option is easily plugged in); Data pre- and post-processing transformations; ML model or ML model chain monitoring (e.g. model name, start time, number of runs, time elapsed, min run time, max run time, model run evaluation metrics (MAE, RMSE, MSE, etc.)); Automatic test generation for running ML model or ML model chain in Data Scientist development environment; Optional automatic MAOW Model Wrapper API onboarding code generation; and Optional deployment of ML model or ML model chain as ML pipeline on cloud.

Thus, the MAOW platform provides the required model onboarding services leaving to ML model or ML model chain the only scientific training and/or prediction.

Note: The only minimal requirement for ML model seamless onboarding is to be adherent to a unified universal interface contract (UUIC) between MAOW platform and ML model or ML model chain.

Note: MAOW core is loosely coupled with ML model, also ML model is loosely coupled with MAOW. Nevertheless, standard log output both of MAOW and ML model is not separated. So that ML output can be tracked together with MAOW output.

Figure 3:
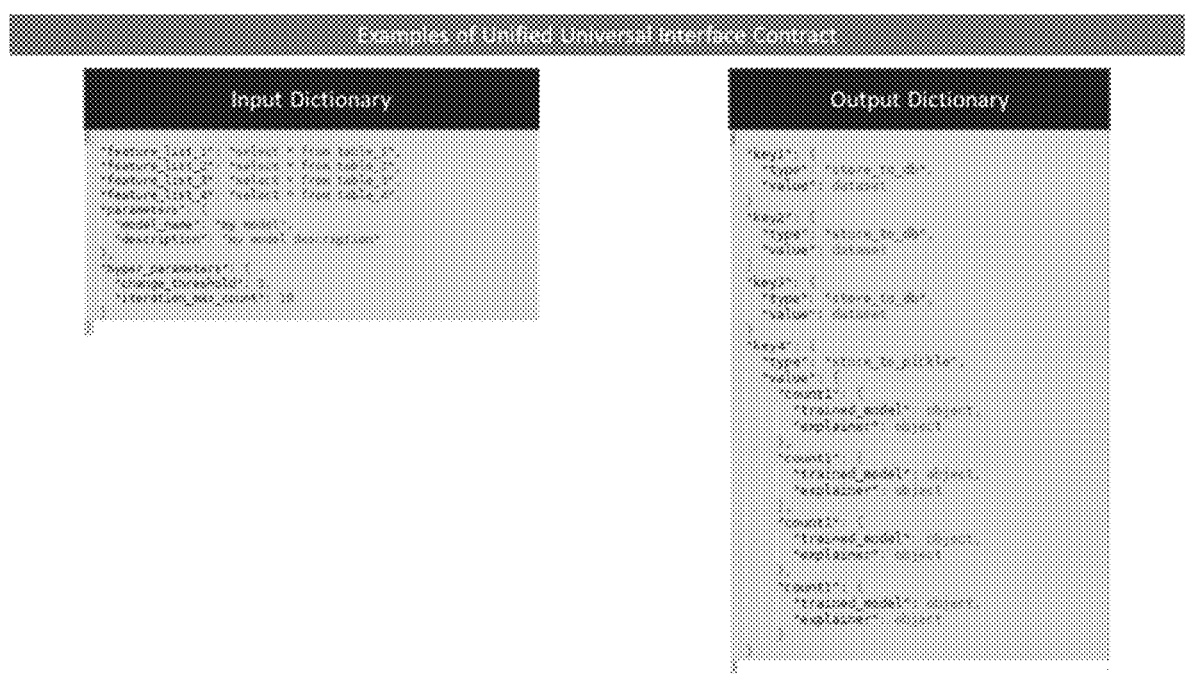
FIG. 3 illustrates an example of a Unified Universal Interface Contract that is the universal unified interface to the platform of FIG. 1, in accordance with one embodiment.

FIG. 3 illustrates an example of a Unified Universal Interface Contract (UUIC) that is the universal unified interface to the platform of FIG. 1, in accordance with one embodiment.

A UUIC is a core component of the suggested solution providing ML model-agnostic functionality. UUIC is defined as dictionary map of dictionary maps and used as the following: input interface between ML model or ML model chain main methods and MAOW, output interface between ML model or ML model chain main methods and MAOW, MAOW internal configuration for serving ML model or ML model chain.

The dictionary of dictionaries paradigm is established as a core interface component between MAOW and ML model and is the most universal data structure. Such a data structure provides required input and output interface flexibility for any ML model onboarded within the MAOW platform. Further for simplicity, embodiments herein call a dictionary map of dictionary maps as dictionary of dictionaries and dictionary map as dictionary.

Dictionary is a set of objects (keys) to another set of objects (values) of any type. Each ML model usually has two dictionaries of dictionaries: input dictionary of dictionaries, and output dictionary of dictionaries. For example, one of the dictionaries in input dictionary of dictionaries is a dictionary of ML model input SQL statements. MAOW uses these SQL statements to provide ML model with input datasets. Another example in output dictionary of dictionaries is dictionary of for storing ML model output datasets. MAOW uses this dictionary for storing ML model output datasets in database, cloud storage, message queue or any other defined repository. See an example for output dictionary of dictionaries in FIG. 3.

Figure 4:
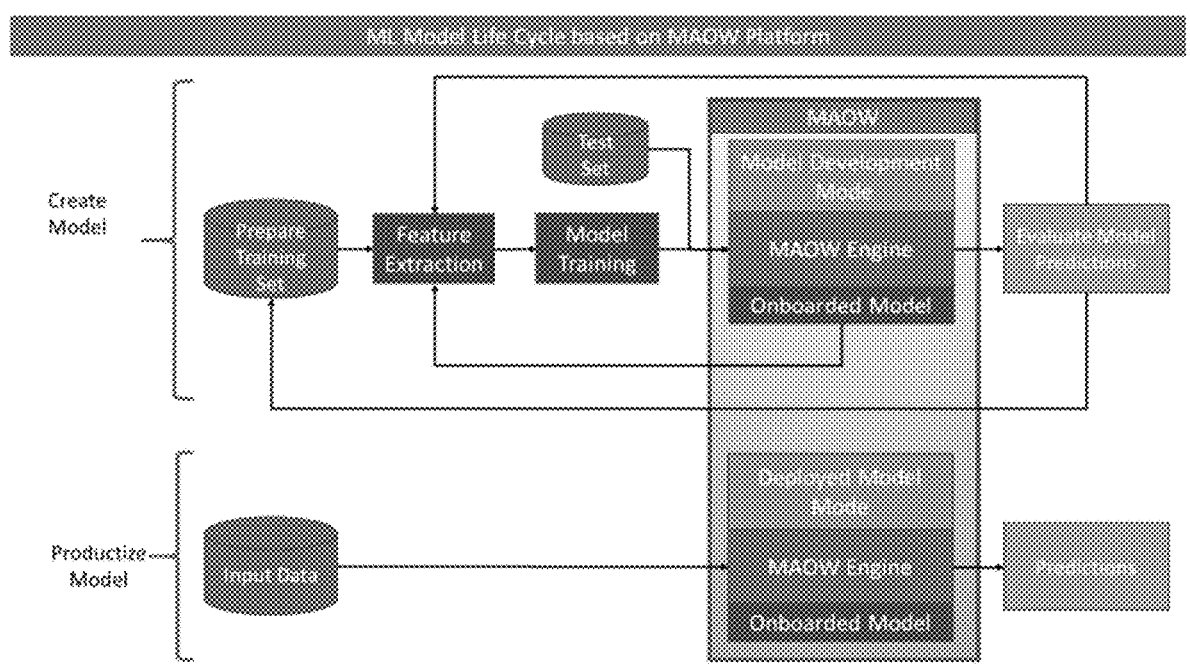
FIG. 4 illustrates a block diagram of the model creating and productizing phases in a machine learning model lifecycle that utilizes the platform of FIG. 1, in accordance with one embodiment.

FIG. 4 illustrates a block diagram of the model creating and productizing phases in a machine learning model lifecycle that utilizes the platform of FIG. 1, in accordance with one embodiment.

Each ML model onboarded by the MAOW platform goes through two automated phases, 1) ML Model creating and 2) ML Model productizing. More details on these phases will be provided in detail below with reference to subsequent figures.

Figure 5:
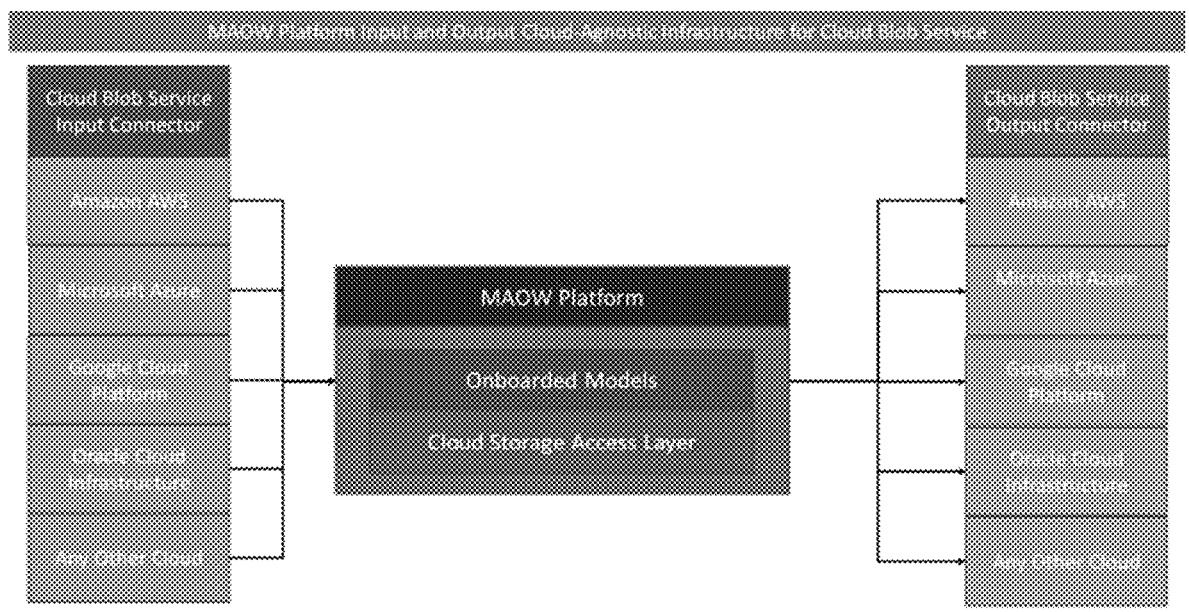
FIG. 5 illustrates a block diagram of the cloud-agnostic infrastructure of the platform of FIG. 1, in accordance with one embodiment.

FIG. 5 illustrates a block diagram of the cloud-agnostic infrastructure of the platform of FIG. 1, in accordance with one embodiment.

MAOW is a cloud-agnostic platform. It means that any cloud can be connected to MAOW platform. Such a seamless connection is achieved based on the following architectural decisions:
  MAOW core code does not contain any dependencies for any cloud libraries;
  MAOW core can be connected to a specific cloud service like blob storage via a separate independent plugin process to keep MAOW core to be loosely coupled with any cloud. Such a plugin can be provided per each specific cloud; and
  MAOW core can be configured to be connected to a specific cloud-service with no-code configuration.

As an additional benefit of such approach, MAOW core can be configured to be connected a hybrid set of specific cloud-services with no-code configuration.

Thus, a set of supported environments, clouds, on-premises, data centers or any other environment is extendable and can be seamlessly connected to the MAOW core with no-code configuration, as shown in FIG. 5.

FIG. 6 illustrates an example of a configuration file used for onboarding a machine learning model to the platform of FIG. 1, in accordance with one embodiment.

The ML model creating phase is implemented by the Data Scientist (or other development application) role.

The MAOW platform allows this role to develop ML model or ML model chain and then onboard and run it locally using one of three MAOW options, the first of which is a no-code option as shown in FIG. 6. For this option, Data Scientist may configure ML model or ML model chain input/output using a curated onboarding configuration file in a JSON file format.

The second option is a Dummy "fail fast" run. When configured for this run type, onboarded ML model or ML model chain runs as a prototype. Dummy "fail fast" run allows: validating correct onboarding of components and their configuration and interaction; and accelerating ML model or ML model chain creating and onboarding phase. A dummy "fail fast" model prototype contains the automatically generated following components: unified universal interface contract (UUIC), a few rows for each configured input, and a dummy dataset for each configured output.

Note: for dummy "fail fast" model main method is replaced with an empty body leaving only input and output parameters signature.

The third option is a Low-code option. For this option, Data Scientist may use MAOW Model Wrapper API to produce a simple run-time configuration MAOW Model Wrapper API main onboarding program for the same ML model input/output shown in Table 1.

TABLE 1

MAOW.add_model_to_chain(...)
MAOW.add_model_input_sql(...)
MAOW.set_compute_power(cpu, memory, ...)
MAOW.run_model_chain(...)
MAW.log_model_metrics(...)

Such a low-code script provides all required onboarding services for ML model or ML model chain. Then the onboarded ML model or ML model chain can be tested locally using a preliminary defined generic test case as well be deployed and submitted to run as a ML pipeline on the cloud or other target environment.

FIG. 7 illustrates a workflow of the platform of FIG. 1, in accordance with one embodiment.

The MAOW platform ML model workflow utilizes a directed acyclic graph (DAG) for running multiple models as a set of tasks with no directed cycles. As mentioned in the "Glossary," ML model chain is a chain of multiple models running one after another inside the same ML pipeline.

Figure 8:
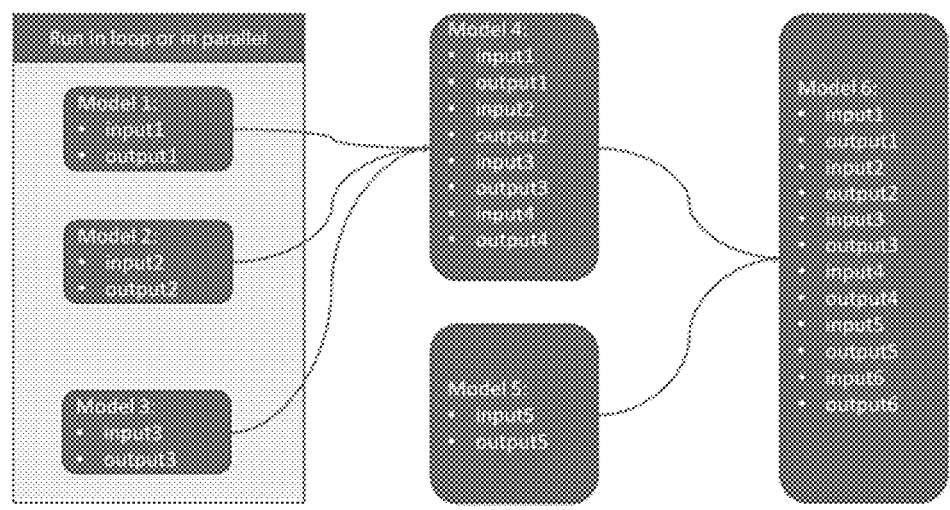
FIG. 8 illustrates a Cache Inheritance Engine of the platform of FIG. 1, in accordance with one embodiment.

Input and output data of each ML model in ML model chain are cached by MAOW platform Cache Inheritance Engine and can optionally serve as input for the any next model in ML model chain. Based on this capability any next model can concatenate or merge its input or output data with input or output data of previously executed models on the model path. Thus, MAOW platform manages to retain its model-agnostic nature while providing all data for required data transformations to models themselves. FIG. 8 illustrates a Cache Inheritance Engine of the platform of FIG. 1, in accordance with one embodiment.

The same relates also to ML model workflow configured in MAOW platform as DAG. The ML model chain workflow pattern is a simplest case of DAG and is used as the default MAOW Platform ML model workflow. MAOW platform no-code configuration data structure can support any required model workflow that conforms to DAG rules.

Figure 9:
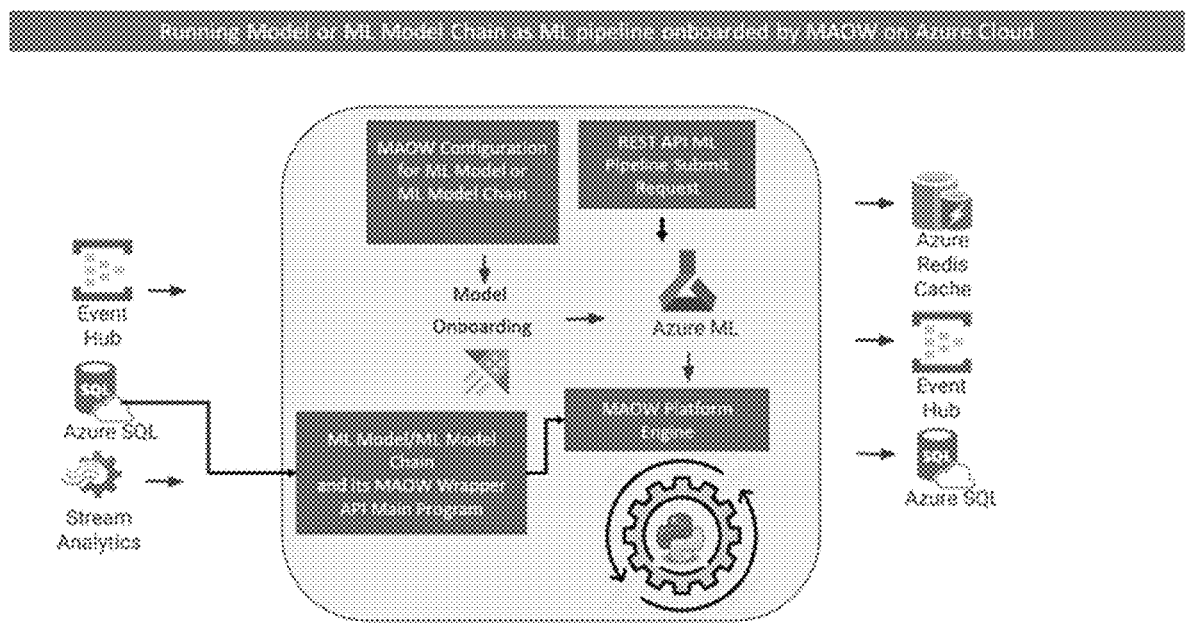
FIG. 9 illustrates a block diagram of a flow for running a deployed machine learning model as a machine learning pipeline of the platform of FIG. 1, in accordance with one embodiment.

FIG. 9 illustrates a block diagram of a flow for running a deployed machine learning model as a machine learning pipeline of the platform of FIG. 1, in accordance with one embodiment.

The ML model or ML model chain productizing phase grants the following:

1) Allowing to data scientist to concentrate on ML model scientific creating accompanied with automatic no-code model-agnostic integration of ML model or ML model chain with various onboarding services.
2) Providing ML model or ML model chain with seamless connecting to input and output data resources of different types.
3) Providing output database tables metadata allowing ML model output dataset validation for dataset schema, duplicates, etc. to accelerate ML model productizing phase.
4) Reproducing runs as per their assigned version, input and output resources, running environments, external parameters and model hyperparameters.

The ML model or ML model chain productizing phase as per available option is an entirely No-Code process comprised of the following steps:
1) Run a script for one-time installing MAOW platform run-time engine on a target computer as a pre-requisite step for all following subsequent steps having this target computer as a cloud virtual server machine, on-premises server or any other server for running ML pipelines;
2) Invoke a MAOW platform dedicated script using a web, CLI or any other GUI interface to automatically create or generate the following:
A) an onboarding configuration file to connect ML model to: required feature lists as input data sources, and required output data sources;
B) MAOW Model Wrapper API main onboarding program—this program is invoked by the deployed ML pipeline when the last is submitted by user or by an external schedule service;
C) ML model or ML model chain deployment as ML pipeline on the target computer;
D) Local and remote GIT folder where the following project files for the deployed ML pipeline will be stored for version control where ML model or ML model chain are effectively separated from MAOW-related files: ML model or ML model chain files, onboarding configuration file, MAOW Model Wrapper API main onboarding program.
3) When ML pipeline is submitted for execution on the target computer all project files for this specific ML pipeline are uploaded by the specific cloud services to a dedicated run location on the target computer.

Note: in case of non-ML cloud server, on-premises server or any other non-cloud server projects files are uploaded by a dedicated MAOW script.

Note: MAOW platform uses onboarding configuration file as well for storing settings of the deployed ML pipeline settings and monitoring statistics of execution runs.

FIG. 9 describes a flow for running a deployed ML model or ML model chain as ML pipeline.

Figure 10:
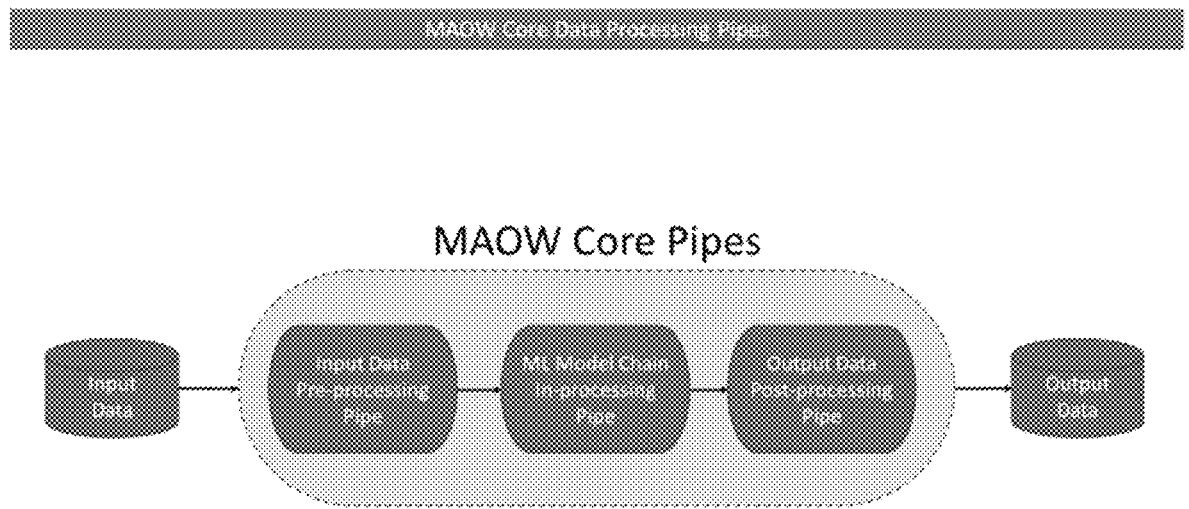
FIG. 10 illustrates a block diagram of the run-time architecture of the core of the platform of FIG. 1, in accordance with one embodiment.

FIG. 10 illustrates a block diagram of the run-time architecture of the core of the platform of FIG. 1, in accordance with one embodiment.

The MAOW core consists of an internal set of pre-, in- and post-processing generic pipes that serve any ML model or ML model chain as per onboarding configuration file, as shown in FIG. 10. Each pipe consists of a logically separated set of extendable conditional generic steps serving ML model or ML model chain as per its specific onboarding configuration file.

Figure 11:
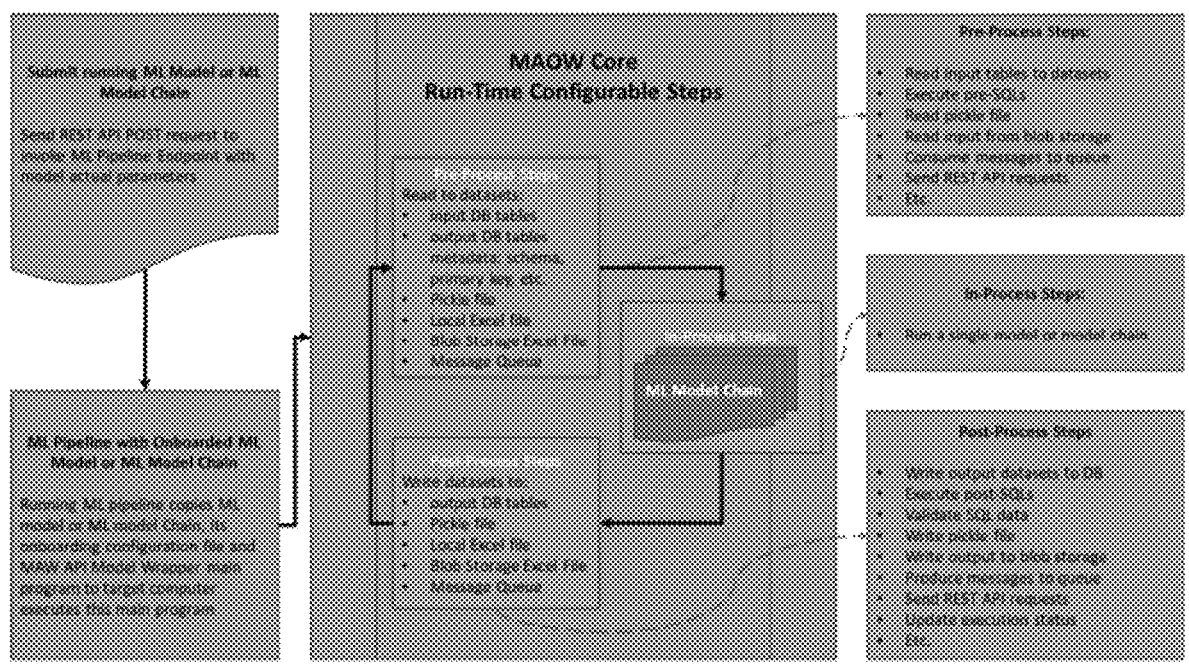
FIG. 11 illustrates a flow of the run-time steps of the core of the platform of FIG. 1, in accordance with one embodiment.

FIG. 11 illustrates a flow of the run-time steps of the core of the platform of FIG. 1, in accordance with one embodiment.

Each MAOW core pipe consists of a several specified generic and extendable steps where each step is a unit of work running conditionally as per options defined in onboarding configuration file for the specific ML Model or ML Model Chain.

Optionally ML Model or ML Model Chain can be run with using MAOW Model Wrapper API low-code program—see above described ML Model Creating Phase.

MAOW core uses onboarding configuration file for storing of the following: ML model or ML model chain configuration settings, the deployed ML pipeline settings, monitoring statistics of execution runs.

Onboarding configuration file is updated in GIT after each ML Model or ML Model Chain run with its monitoring statistics.

FIG. 11 describes MAOW core run-time configurable steps on submitting onboarded ML or ML model chain as ML pipeline for execution on cloud or on premises or other target environment.

FIG. 12 illustrates a block diagram of the infrastructure services provided by the platform of FIG. 1 for an onboarded machine learning model, in accordance with one embodiment.

The MAOW platform provides generic and extendable input and output types for onboarded ML model or ML model chain based on MAOW platform configuration composability. The MAOW Input and Output Infrastructure Services are shown in FIG. 12.

CONCLUSION

To this end, the embodiments described above provide a machine-learning model-agnostic cloud-agnostic no-code onboarding platform. The platform eliminates ML model productizing time as well as Data Engineer role as an intermediator between Data Scientist and his/her ML model. The platform also achieves two main purposes:
1) It allows to data scientist to concentrate on ML model scientific creating accompanied with automatic no-code or low-code model-agnostic integration with ML model various onboarding services.
2) It allows to DevOps to accelerate and automate ML model or ML model chain deployment on any cloud or on premises.

FIG. 13 illustrates a network architecture 1300, in accordance with one possible embodiment. As shown, at least one network 1302 is provided. In the context of the present network architecture 1300, the network 1302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1302 may be provided.

Coupled to the network 1302 is a plurality of devices. For example, a server computer 1304 and an end user computer 1306 may be coupled to the network 1302 for communication purposes. Such end user computer 1306 may include a desktop computer, lap-top computer, and/or any other type of logic. Still yet, various other devices may be coupled to the network 1302 including a personal digital assistant (PDA) device 1308, a mobile phone device 1310, a television 1312, etc.

Figure 14:
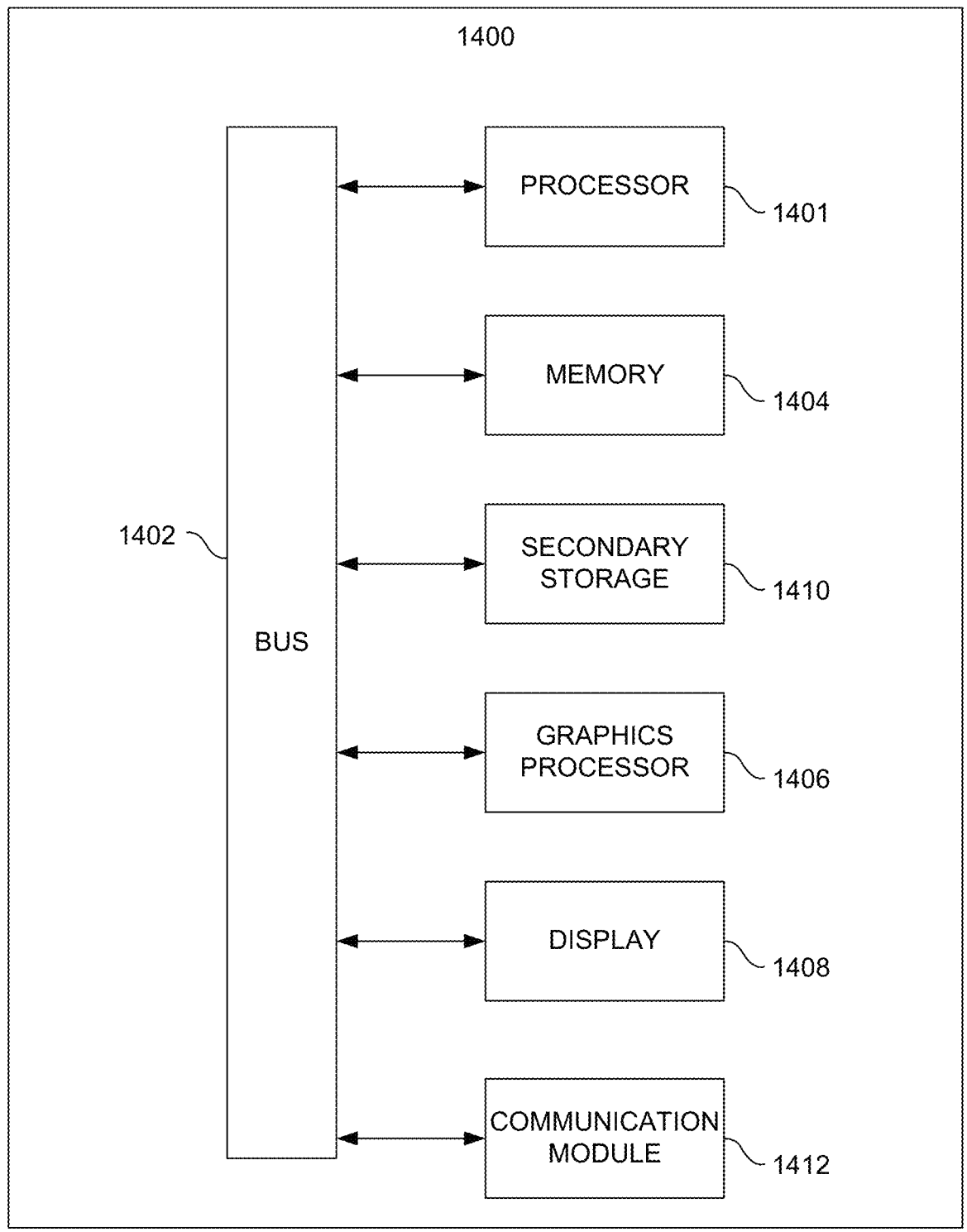
FIG. 14 illustrates an exemplary system, in accordance with one embodiment.

FIG. 14 illustrates an exemplary system 1400, in accordance with one embodiment. As an option, the system 1400 may be implemented in the context of any of the devices of the network architecture 1300 of FIG. 13. Of course, the system 1400 may be implemented in any desired environment.

As shown, a system 1400 is provided including at least one central processor 1401 which is connected to a communication bus 1402. The system 1400 also includes main memory 1404 [e.g. random access memory (RAM), etc.]. The system 1400 also includes a graphics processor 1406 and a display 1408.

The system 1400 may also include a secondary storage 1410. The secondary storage 1410 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 1404, the secondary storage 1410, and/or any other memory, for that matter. Such computer programs, when executed, enable the system 1400 to perform various functions (as set forth above, for example). Memory 1404, storage 1410 and/or any other storage are possible examples of non-transitory computer-readable media.

The system 1400 may also include one or more communication modules 1412. The communication module 1412 may be operable to facilitate communication between the system 1400 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
    providing a universal unified interface to a Model-Agnostic Onboarding Workflow (MAOW) platform, wherein the MAOW platform is configured as a no-code, model-agnostic, cloud-agnostic platform, and wherein the universal unified interface includes a dictionary of machine learning model input structured query language (SQL) statements and a dictionary of machine learning model output destinations;
    onboarding a chain of machine learning models using the MAOW platform, based on the universal unified interface, wherein the MAOW platform:
        creates an onboarding configuration file that indicates the dictionary of machine learning model input SQL statements for use in providing the chain of machine learning models with input datasets and that indicates the dictionary of machine learning model output destinations for use in storing output datasets of the chain from machine learning models,
        creates a machine learning model pipeline for deployment of the chain of machine learning models as multiple machine learning models running one after another,
        uses the dictionary of machine learning model input SQL statements to provide the chain of machine learning models with the input datasets,
        caches input and output data of each machine learning model in the chain of machine learning models such that output data of one machine learning model in the chain of machine learning models is provided from the cache as input to a next machine learning model in the chain of machine learning models in accordance with the machine learning model pipeline, and
        uses the dictionary of machine learning model output destinations to store the output datasets from the chain of machine learning models; and
    deploying the chain of machine learning models from the MAOW platform to at least one target environment.

2. The non-transitory computer readable medium of claim 1, wherein MAOW platform interfaces a development environment in which the chain of machine learning models is created.

3. The non-transitory computer readable medium of claim 1, wherein the universal unified interface is a Unified Universal Interface Contract (UUIC) that serves as an interface between the chain of machine learning models and the MAOW platform.

4. The non-transitory computer readable medium of claim 3, wherein the UUIC serves both input and output between main methods of the chain of machine learning models and the MAOW platform.

5. The non-transitory computer readable medium of claim 4, wherein the UUIC is defined as a dictionary map of dictionary maps.

6. The non-transitory computer readable medium of claim 1, wherein the MAOW platform enables automatic no-code configuration and customization of the chain of machine learning models.

7. The non-transitory computer readable medium of claim 6, wherein the no-code configuration defines machine learning model-agnostic pre-processing and post-processing.

8. The non-transitory computer readable medium of claim 7, wherein the pre-processing includes reading input for the chain of machine learning models from one or more defined input sources.

9. The non-transitory computer readable medium of claim 7, wherein the post-processing includes writing output of the chain of machine learning models to one or more defined output destinations.

10. The non-transitory computer readable medium of claim 6, wherein the no-code configuration further defines data pre- and post-transformations.

11. The non-transitory computer readable medium of claim 1, wherein the chain of machine learning models is deployed and run as the machine learning pipeline on the target environment.

12. The non-transitory computer readable medium of claim 1, wherein the target environment is one of a plurality of supported environments, the plurality of supported environments including a cloud environment, a hybrid cloud environment, an on-premises environment, a data center environment, and a local computer of a development and test environment in which the at least one machine learning model is created and tested.

13. The non-transitory computer readable medium of claim 1, further comprising:
    running the onboarded chain of machine learning models locally as a prototype to validate correct onboarding of components and their configuration and interaction, wherein a main method of the onboarded chain of machine learning models is replaced with an empty body leaving only an input and output parameters signature.

14. The non-transitory computer readable medium of claim 1, further comprising:
    using a MAOW Model Wrapper application programming interface (APIA to produce a run-time configuration MAOW Model Wrapper API main onboarding program for a particular input/output for the chain of machine learning models and testing the onboarded chain of machine learning models locally using a preliminary defined generic test case.

15. The non-transitory computer readable medium of claim 1, wherein the MAOW platform includes:

a workflow that utilizes a directed acyclic graph (DAG) for running multiple models as a set of tasks with no directed cycles.

16. The non-transitory computer readable medium of claim 1, wherein the MAOW platform provides output database tables metadata allowing machine learning model output dataset validation to accelerate a machine learning model productizing phase.

17. A method, comprising:
providing a universal unified interface to a Model-Agnostic Onboarding Workflow (MAOW) platform, wherein the MAOW platform is configured as a no-code, model-agnostic, cloud-agnostic platform, and wherein the universal unified interface includes a dictionary of machine learning model input structured query language (SQL) statements and a dictionary of machine learning model output destinations;
onboarding a chain of machine learning models using the MAOW platform, based on the universal unified interface, wherein the MAOW platform:
 creates an onboarding configuration file that indicates the dictionary of machine learning model input SQL statements for use in providing the chain of machine learning models with input datasets and that indicates the dictionary of machine learning model output destinations for use in storing output datasets of the chain from machine learning models,
 creates a machine learning model pipeline for deployment of the chain of machine learning models as multiple machine learning models running one after another,
 uses the dictionary of machine learning model input SQL statements to provide the chain of machine learning models with the input datasets,
 caches input and output data of each machine learning model in the chain of machine learning models such that output data of one machine learning model in the chain of machine learning models is provided from the cache as input to a next machine learning model in the chain of machine learning models in accordance with the machine learning model pipeline, and
 uses the dictionary of machine learning model output destinations to store the output datasets from the chain of machine learning models; and
deploying the chain of machine learning models from the MAOW platform to at least one target environment.

18. A system, comprising:
a non-transitory memory storing instructions; and
one or more processors in communication with the non-transitory memory that execute the instructions to perform a method comprising:
providing a universal unified interface to a Model-Agnostic Onboarding Workflow (MAOW) platform, wherein the MAOW platform is configured as a no-code, model-agnostic, cloud-agnostic platform, and wherein the universal unified interface includes a dictionary of machine learning model input structured query language (SQL) statements and a dictionary of machine learning model output destinations;
onboarding a chain of machine learning models using the MAOW platform, based on the universal unified interface, wherein the MAOW platform:
 creates an onboarding configuration file that indicates the dictionary of machine learning model input SQL statements for use in providing the chain of machine learning models with input datasets and that indicates the dictionary of machine learning model output destinations for use in storing output datasets of the chain from machine learning models,
 creates a machine learning model pipeline for deployment of the chain of machine learning models as multiple machine learning models running one after another,
 uses the dictionary of machine learning model input SQL statements to provide the chain of machine learning models with the input datasets,
 caches input and output data of each machine learning model in the chain of machine learning models such that output data of one machine learning model in the chain of machine learning models is provided from the cache as input to a next machine learning model in the chain of machine learning models in accordance with the machine learning model pipeline, and
 uses the dictionary of machine learning model output destinations to store the output datasets from the chain of machine learning models; and
deploying the chain of machine learning models from the MAOW platform to at least one target environment.

* * * * *